(12) United States Patent
Schmitt (10) Patent No.: US 7,434,595 B2
(45) Date of Patent: Oct. 14, 2008

(54) SAFETY VALVE ASSEMBLY HAVING SET AND RESET MECHANISMS

(75) Inventor: Craig Schmitt, Phoenix, AZ (US)

(73) Assignee: Watts Water Technologies, Inc., North Andover, MA (US)

( * ) Notice: Subject to any disclaimer, the term of this patent is extended or adjusted under 35 U.S.C. 154(b) by 224 days.

(21) Appl. No.: 11/286,756

(22) Filed: Nov. 23, 2005

(65) Prior Publication Data

US 2006/0070663 A1   Apr. 6, 2006

Related U.S. Application Data

(63) Continuation-in-part of application No. 11/215,781, filed on Aug. 30, 2005, now Pat. No. 7,380,567.

(60) Provisional application No. 60/605,572, filed on Aug. 30, 2004.

(51) Int. Cl.
*F16K 17/30* (2006.01)

(52) U.S. Cl. .................................... 137/462; 137/498

(58) Field of Classification Search .............. 137/460, 137/462, 498, 504
See application file for complete search history.

(56) References Cited

U.S. PATENT DOCUMENTS 2,227,297 A * 12/1940 Coy ........................... 137/462
2,266,533 A * 12/1941 Brisbane et al. ............. 137/460
2,684,689 A * 7/1954 Nordin ....................... 137/460
3,735,777 A 5/1973 Katzer et al.
4,129,141 A * 12/1978 Vogeli ........................ 137/462
4,250,915 A 2/1981 Rikuta
4,345,593 A * 8/1982 Sullivan ...................... 137/498
5,103,857 A 4/1992 Kuhn et al.
5,215,178 A 6/1993 Bartlett
5,222,518 A * 6/1993 Fisher et al. ................ 137/460
5,294,093 A 3/1994 Huveteau et al.
2004/0182442 A1* 9/2004 Frampton et al. ........... 137/460
2004/0221893 A1 11/2004 Johnson

FOREIGN PATENT DOCUMENTS

CN   2203388   7/1995
CN   2725664   9/2005

* cited by examiner

*Primary Examiner*—Stephen M Hepperle
(74) *Attorney, Agent, or Firm*—Fish & Richardson P.C.

(57) ABSTRACT

A valve assembly includes an automatic excess flow shut-off mechanism for preventing excess flow between an inlet and an outlet of the assembly. The excess flow shut-off mechanism is adapted to automatically stop fluid flow through the valve assembly when the flow exceeds a specified flow rate. The excess flow shut-off mechanism prevents flow when it's set and allows flow when it's reset. The valve assembly also includes a manual set mechanism for setting the excess flow shut-off mechanism even when there is no excess flow. The valve assembly additionally includes a manual reset mechanism for resetting the shut-off mechanism and for allowing excess flow.

18 Claims, 6 Drawing Sheets

FIG. 6 ns, and a reset mechanism; and

SAFETY VALVE ASSEMBLY HAVING SET AND RESET MECHANISMS

CROSS-REFERENCE TO RELATED APPLICATION

The present application is a continuation-in-part of U.S. patent application Ser. No. 11/215,781, filed Aug. 30, 2005, now U.S. Pat. No. 7,380,567 which claims priority from provisional U.S. Patent Application Ser. No. 60/605,572, filed Aug. 30, 2004, now abandoned and is incorporated herein by reference in its entirety.

TECHNICAL FIELD OF THE DISCLOSURE

This disclosure relates to valve assemblies and, more particularly, to a safety, or automatic excess flow shut-off, valve assembly having manual set and reset mechanisms.

BACKGROUND OF THE DISCLOSURE

Safety, or excess flow shut-off, valve assemblies are used to prevent uncontrolled (excess) fluid flow resulting from a break in a conduit, such as a flexible conduit connecting a filter system to faucet or a water source. U.S. Pat. No. 3,735,777 discloses an automatic shut-off valve for use with household appliances to prevent the release of water due to a hose connection becoming loose or breaking. The need to prevent uncontrolled excess flow has also been recognized in applications other than water systems. U.S. Pat. No. 5,215,178, for example, discloses a rapid acting safety valve for preventing leakages resulting from failure of a pressurized hydraulic line. In both cases, the valves allow normal flow but automatically close to terminate flow when the flow through the valve becomes excessive, as would occur upon the failure of a hose connection. If excess flow occurs, a valve flapper or piston moves against the force of a spring to close against a valve seat.

A rapid acting shutoff such as disclosed in U.S. Pat. No. 5,215,178 would be subject to premature nuisance shutoff if used to supply a flexible connector in a household water system. In a water system, air can be present in the piping system. A flow surge can occur when air flows through a faucet or toilet fill valve supplied from a flexible connector. A rapid acting shutoff could close in response to such a surge, disabling the supplied appliance until the shutoff condition is corrected by reopening the shutoff device. The valve disclosed in U.S. Pat. No. 3,735,777 includes a damping mechanism to prevent premature nuisance shutoff. An excess flow shut-off valve disclosed in U.S. Pat. Application Publication No.: US 2004/0221893 A1 also includes a damping mechanism to prevent premature nuisance shutoff. In each case, however, these valves must be disconnected to relieve pressure in order to be reset after the failure of a flexible connector. In addition, these valves do not include a reset function for resetting the shut-off mechanism and for allowing excess flow to pass through the valve.

What is still desired is a new and improved safety valve assembly. Among other advantages and benefits, the new and improved safety valve assembly will preferably include a reset mechanism that allows manual opening ("reset") of the valve. Manual operation of the safety valve assembly, for example, beneficially allows the valve assembly to be reset without first being disconnected from a fluid conduit. Manual operation also allows the safety valve assembly to be held open during excess flow. The new and improved safety valve assembly will preferably also include a set mechanism that causes the valve assembly to be manually closed ("set"). This manual operation allows the valve assembly to be closed if desired even when there is no excess flow.

SUMMARY OF THE DISCLOSURE

The present disclosure provides a new and improved safety valve assembly including an excess flow shut-off mechanism for controlling flow between an inlet and an outlet of the assembly. The excess flow shut-off mechanism is adapted to automatically stop fluid flow through the valve assembly when the flow exceeds a specified flow rate. The excess flow shut-off mechanism prevents flow when it's set and allows flow when it's reset. The valve assembly also includes a set mechanism for manually setting the shut-off mechanism even when there is no excess flow.

The present disclosure also provides a new and improved safety valve assembly including an excess flow shut-off mechanism and a reset mechanism for resetting the excess flow shut-off mechanism when pressed and for allowing excess flow when held.

Additional aspects and advantages of the present disclosure will become readily apparent to those skilled in this art from the following detailed description, wherein only an exemplary embodiment of the present disclosure is shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF DRAWINGS

Reference is made to the attached drawings, wherein elements having the same reference character designations represent like elements throughout, and wherein.

DETAILED DESCRIPTION OF EXEMPLARY EMBODIMENTS

Referring to the drawings, the present disclosure provides a safety valve assembly 10 including an excess flow shut-off mechanism 12, a set mechanism 14 for setting the excess flow shut-off mechanism 12 when pressed, and a reset mechanism 16 for resetting the shut-off mechanism 12 when pressed and for allowing excess flow when held. An exemplary embodiment of the valve assembly 10 is shown in FIGS. 1-6.

Figure 1:
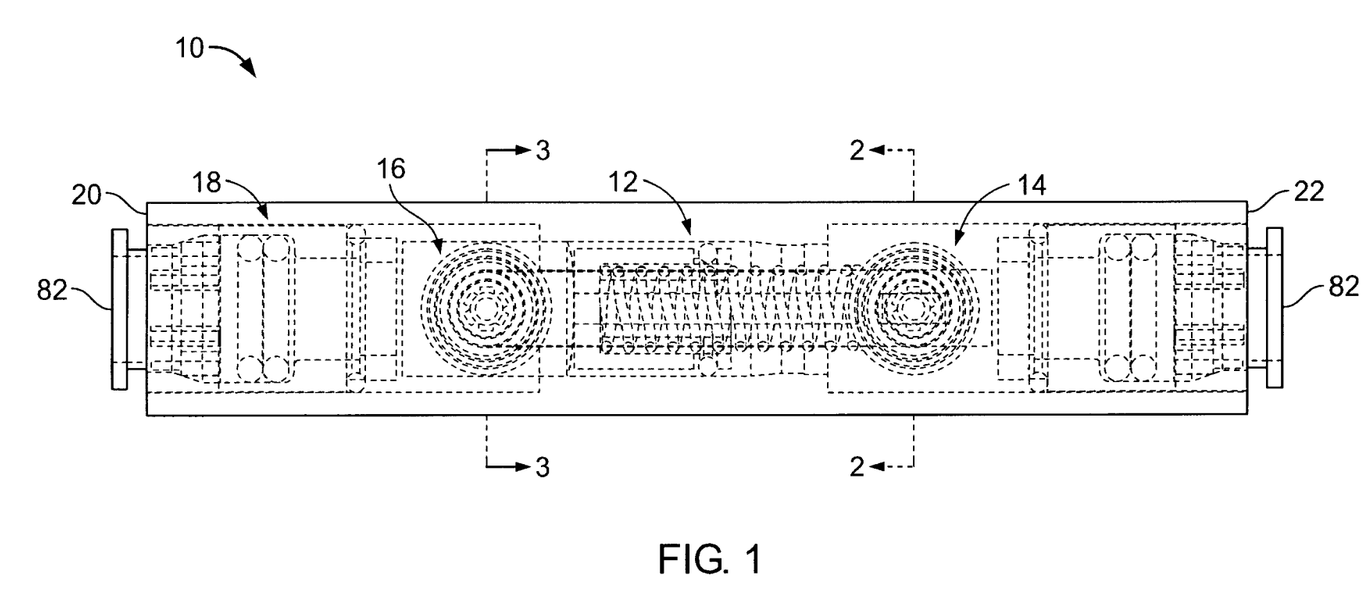
FIG. 1 is a bottom plan view of an exemplary embodiment of a safety valve assembly constructed in accordance with the present disclosure and including an excess flow shut-off mechanism, a set mechanism, and a reset mechanism.
Figure 2:
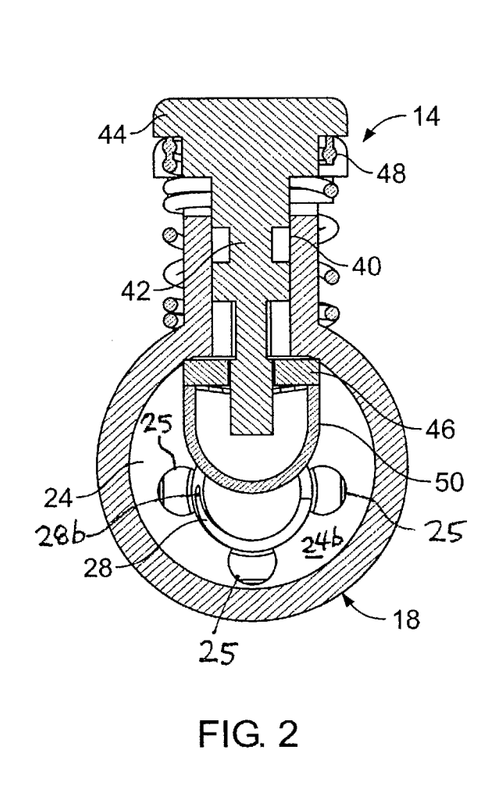
FIG. 2 is a sectional view of the set mechanism of the valve assembly taken along line 2-2 of FIG. 1.
Figure 3:
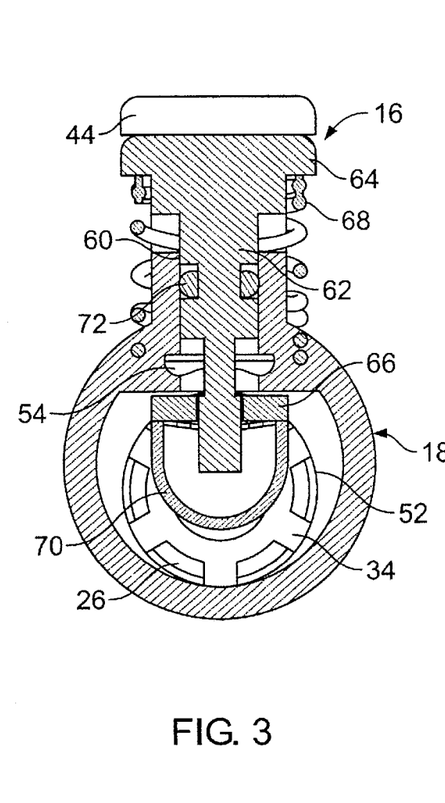
FIG. 3 is a sectional view of the reset mechanism of the valve assembly taken along line 3-3 of FIG. 1.
Figure 4:
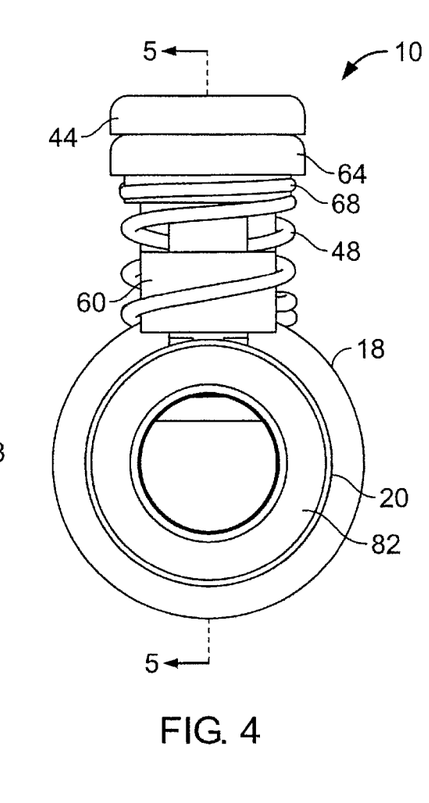
FIG. 4 is an elevation view of an inlet end of the valve assembly of FIG. 1.
Figure 5:
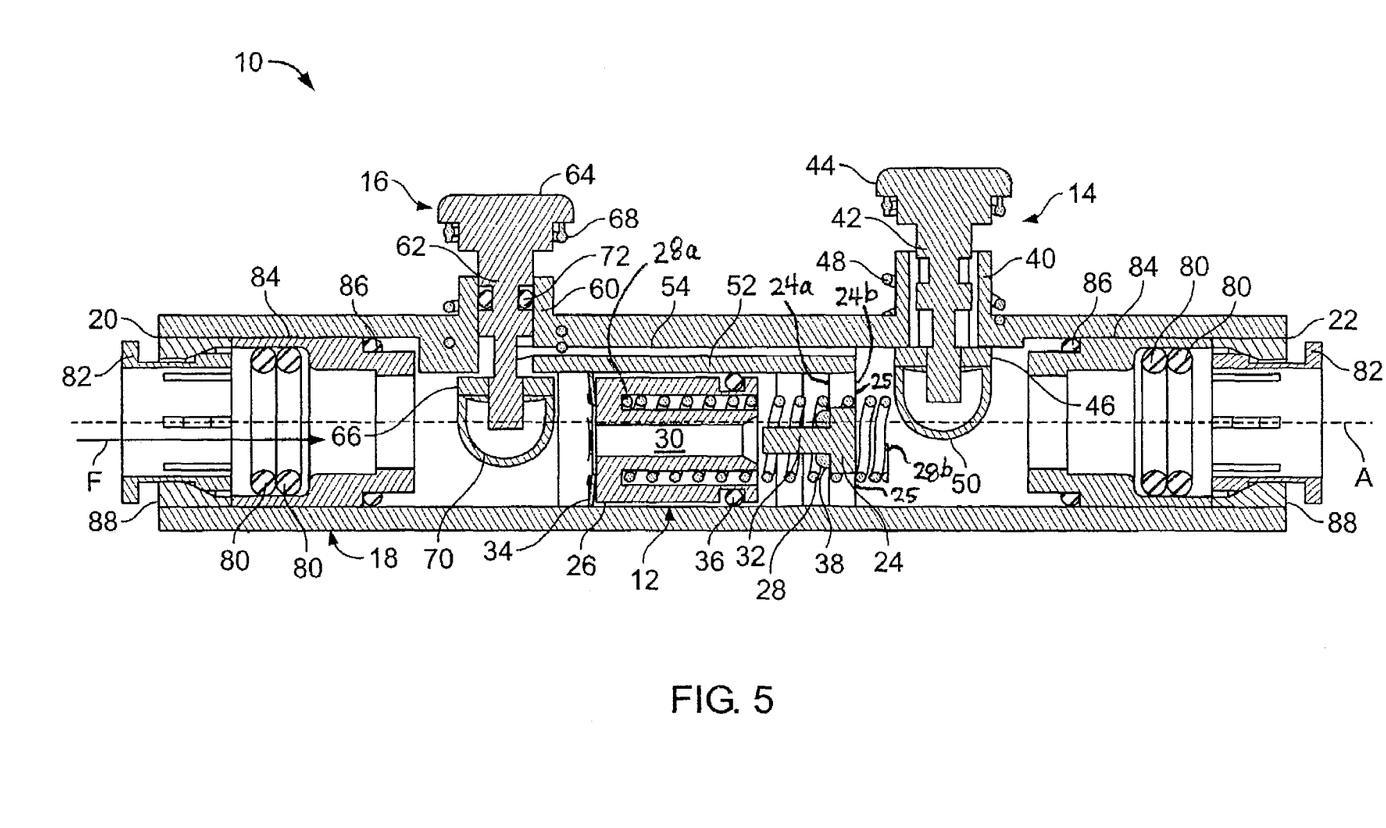
FIG. 5 is a sectional view of the valve assembly taken along line 5-5 of FIG. 4.

Referring to FIGS. 1 and 5, the valve assembly 10 includes a housing 18 and the excess flow shut-off mechanism 12 is contained within the housing for controlling flow between an inlet 20 and an outlet 22 of the housing. In the exemplary embodiment shown, the housing 18 comprises an elongated tube and, as shown in FIG. 5, includes a central longitudinal axis "A" extending between the inlet 20 and the outlet 22. The direction of fluid flow through the housing 18 is illustrated by arrow "F" in FIG. 5.

The excess flow shut-off mechanism 12 is adapted to automatically stop fluid flow through the housing 18 when the flow exceeds a specified flow rate (e.g., ½ gallon per minute). The excess flow shut-off mechanism 12 is normally biased to an open position allowing fluid flow through the housing 18 and is adapted to move to a closed position preventing fluid flow through the housing 18 when upstream pressure between the inlet 20 and the shut-off mechanism 12 is greater by at least a predetermined amount than a downstream pressure between the shut-off mechanism 12 and the outlet 22 (e.g., the pressure differential resulting from at least ½ gallon per minute of flow). This feature is desirable in household appliances, for example, to prevent water damage due to leaks or broken water conduits. In one particular example, the safety valve assembly 10 is used in a water filtration system. The excess flow shut-off mechanism 12 prevents flow when it's set (e.g., closed) and allows flow when it's reset (e.g., opened). The excess flow shut-off mechanism 12 is shown reset, or open, in the drawings.

Figure 5A:
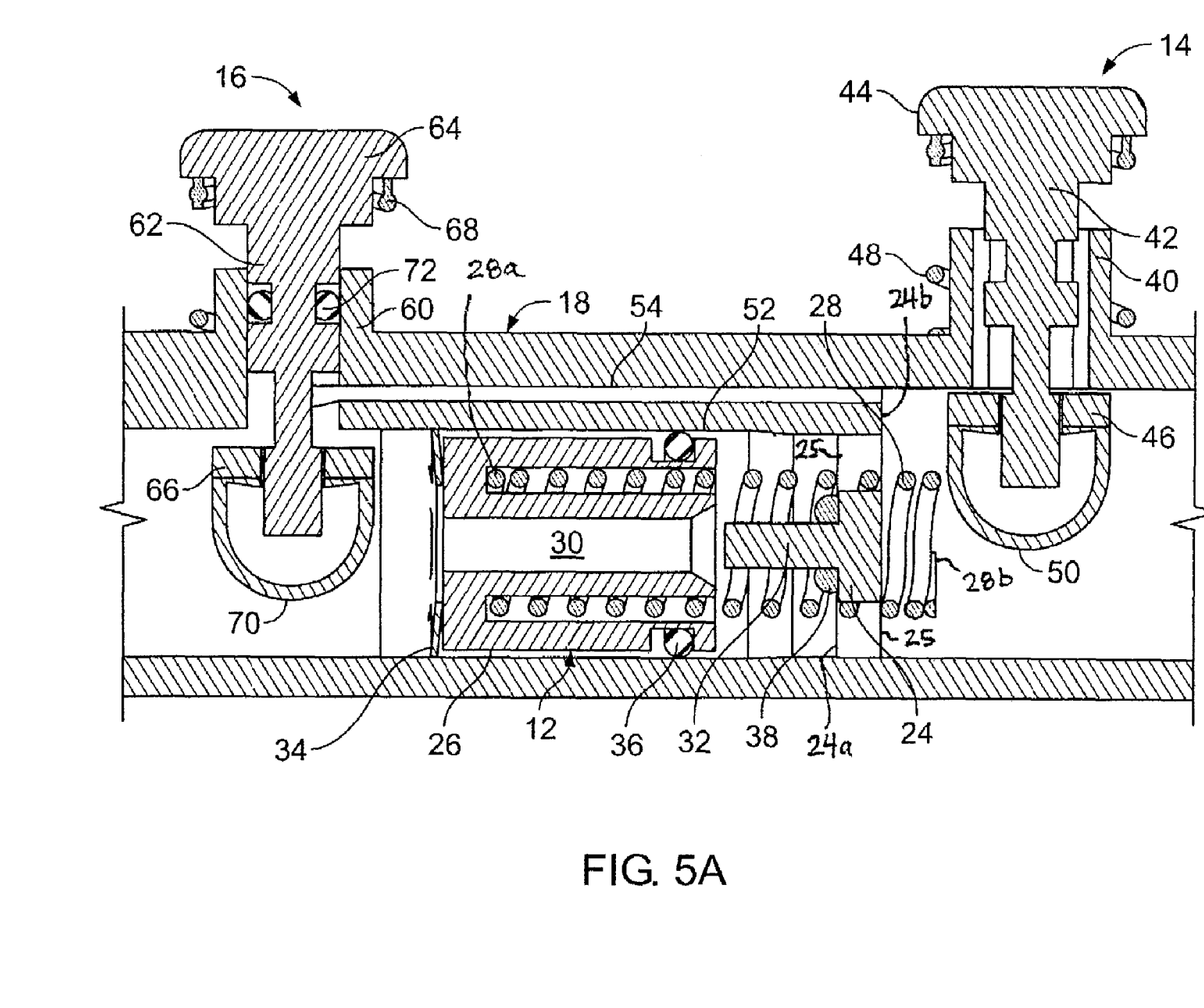
FIG. 5A is an enlarged portion of the sectional view of the valve assembly taken along line 5-5 of FIG. 4, wherein the reset mechanism is shown in an opened position.
Figure 5B:
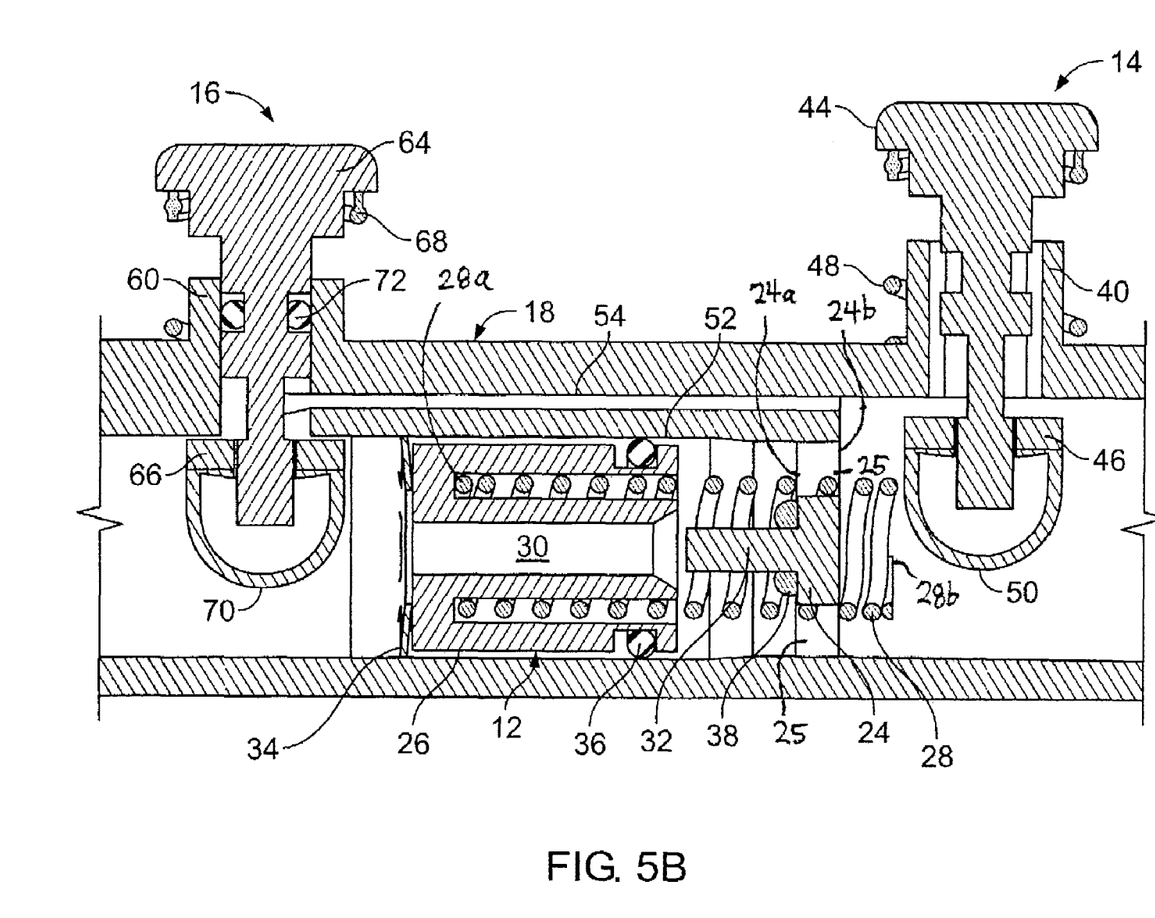
FIG. 5B is an enlarged portion of the sectional view of the valve assembly taken along line 5-5 of FIG. 4, wherein the set mechanism is shown in an opened position.

As shown best in FIGS. 5, 5A, and 5B, the excess flow shut-off mechanism 12 includes a valve seat 24, a valve member 26 movable between an open position allowing fluid flow through the housing 18 and a closed position wherein the valve member 26 contacts the valve seat 24 and prevents fluid flow through the housing 18. The shut-off mechanism 12 also includes a spring 28 biasing the valve member 26 to the open position. The shut-off mechanism 12 is positioned within the housing 18 such that the valve member 26 is moved to the closed position against the biasing force of the spring 28 when the flow exceeds a specified flow rate and the excess flow rate causes upstream pressure between the inlet 20 of the housing 18 and the shut-off mechanism 12 to be greater by at least a predetermined amount than downstream pressure between the shut-off mechanism 12 and the outlet 22 of the housing 18.

In the exemplary embodiment shown, the valve member comprises a sleeve 26 having a flow passage 30 and the valve seat 24 includes an insert 32 for receipt in the flow passage 30 as the sleeve 26 is moved to the closed position. The valve seat 24 also includes a first side 24a that faces the valve member 26, a second side 24b that faces the outlet 22, and openings 25 that allow fluid flow when the valve member 26 is spaced from the valve seat 24. The spring comprises a compression spring 28 having a first end 28a placed against the valve member 26 and a second end 28b extending through the valve seat 24. The spring 28 is compressed between the valve member 26 and the first side 24a of the valve seat 24 and biases the valve member 26 away from the valve seat 24. During assembly, the second end 28b of the spring 28 is threaded through one of the openings 25 of the valve seat 24 (the spring 28 is turned like a screw) such that the end 28b extends past the valve seat 24 towards the outlet 22. It should be noted, however, that the present disclosure is not limited to this exemplary embodiment. In an alternative embodiment, for example, the spring 28 might only be located entirely between the valve member 26 and the valve seat 24 and not extend through the valve seat. The shut-off mechanism 12 also includes a fastener 34 limiting movement of the valve member 26 away from the valve seat 24, and O-rings 36, 38 for preventing flow around and through the closed valve member 26.

The set mechanism 14, which is shown best in FIGS. 2, 5, 5A, and 5B, is used to manually set the excess flow shut-off mechanism 12 in order to stop flow through the assembly 10, as desired and regardless of the flow rate. This feature is desirable when installing or testing a water filtration system including the valve assembly 10, for example. In FIG. 5B, the set mechanism 14 is shown in an opened, or actuated, position, while in FIGS. 2, 5, and 5A the set mechanism 14 is shown in a closed, or non-actuated, position.

When actuated, the set mechanism 14 reduces the downstream pressure between the shut-off mechanism 12 and the outlet 22 and allows the spring 28 of the shut-off mechanism 12 to be overcome by the upstream fluid pressure and the valve member 26 moved to the closed position. Referring to FIGS. 2, 5, 5A, and 5B, the set mechanism 14 includes a set port 40 located in a sidewall of the housing 18 between the shut-off mechanism 12 and the outlet 22, and a plunger 42 received in the set port 40 and including a first end located out of the housing 18 and a second end located within the housing 18. A button 44 is secured to the first end of the plunger 42 and a seal 46 is secured to the second end of the plunger 42. The set mechanism 14 also includes a spring 48 biasing the plunger 42 out of the housing 18 so that the seal 46 normally closes the set port 40. Pressing the plunger 42 into the housing 18 causes the seal 46 to be moved away from the set port 40 and the set port 40 opened so that the downstream pressure between the shut-off mechanism 12 and the outlet 22 is reduced. In the exemplary embodiment shown, a retainer 50 is secured to the second end of the plunger 42, and the seal 46 is located between the retainer 50 and the set port 40 of the housing 18.

The reset mechanism 16, which is shown best in FIGS. 2, 5, 5A, and 5B, allows manual resetting of the excess flow shut-off mechanism 12, without having to disconnect the valve assembly 10 from a conduit (not shown) connected to the outlet 22 of the assembly 10. The reset mechanism 16 causes the excess flow shut-off mechanism 12 to be reset when pressed and allows excess flow through the valve assembly 10 when held. These features are desirable when installing or testing a water filtration system including the valve assembly 10, for example. In FIG. 5A, the reset mechanism 16 is shown in an opened, or actuated, position, while in FIGS. 2, 5, and 5B the reset mechanism 16 is shown in a closed, or non-actuated, position.

When actuated, the reset mechanism 16 equalizes the upstream pressure and the downstream pressure and allows the shut-off mechanism 12 to be biased to the open position. In the exemplary embodiment shown, the housing 18 includes a primary flow passageway 52 receiving the excess flow shut-off mechanism 12, and the reset mechanism 16 includes a reset port 60 located in the sidewall of the housing 18 between the inlet 20 and the shut-off mechanism 12, and a reset passageway 54 providing fluid connection between the reset port 60 and the outlet 22 of the housing 18. The reset mechanism 16 includes a reset plunger 62 received in the reset port 60 and including a first end located out of the housing 18 and a second end located within the housing 18. A button 64 is secured to the first end of the reset plunger 62, and a seal 66 secured to the second end of the reset plunger 62. The reset mechanism 16 also includes a spring 68 biasing the reset plunger 62 out of the housing 18 so that the seal 66 normally closes the reset port 60 and prevents fluid communication through the reset passageway 54. Pressing the plunger 62 into the housing 18 causes the seal 66 to be moved away from the reset port 60 so that fluid can bypass the shut-off mechanism 12 through the reset passageway 54 and equalize the upstream pressure and the downstream pressure, and allows the shut-off mechanism 12 to be biased to the open position regardless of flow rate.

The reset mechanism 16 further includes an o-ring 72 positioned between the reset plunger 62 and the reset port 60 to prevent fluid from exiting the housing 18 through the reset port 60 when the plunger 62 is pressed into the housing 18. A retainer 70 is secured to the second end of the reset plunger 62, and the seal 66 is located between the retainer 70 and the reset port 60 of the housing 18.

Figure 6:
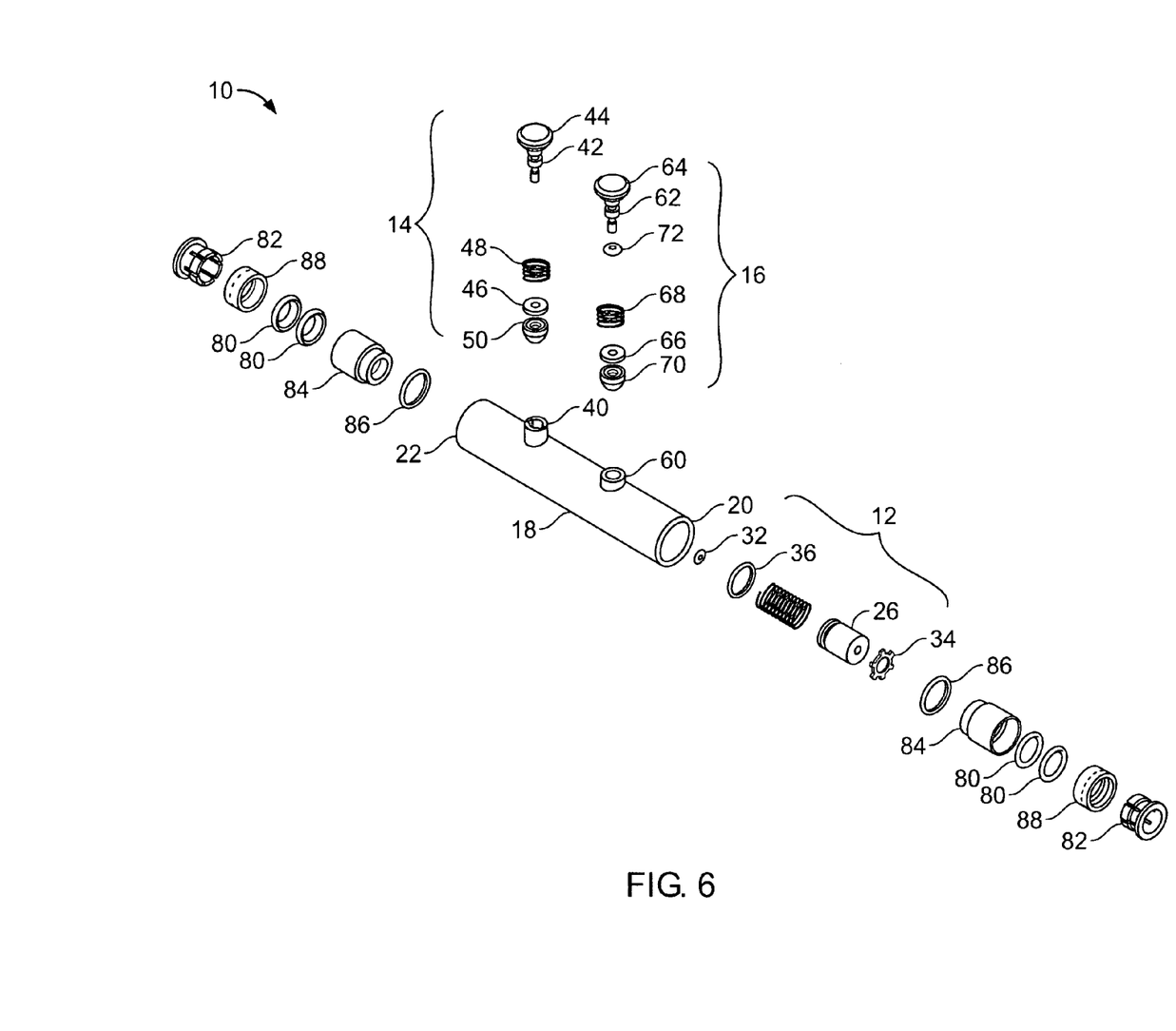
FIG. 6 is an exploded perspective view of the valve assembly of FIG. 1.

The valve assembly is provided with quick-connect coupling means comprising o-rings 80 and a collet 82 in the inlet 20 and the outlet 22. The quick-connect coupling means can be used with quick-connect fittings (not shown) and are secured with a sleeve 84, an o-ring 86, and an annular retainer 88. In alternative embodiments, the inlet 20 and the outlet 22 can be provided without coupling means or can be provided with other types of coupling means, such as screw threads.

Thus, the present disclosure provides a new and improved safety valve 10 including a set mechanism 14 and a reset mechanism 16. It should be understood, however, that the exemplary embodiment described in this specification has been presented by way of illustration rather than limitation, and various modifications, combinations and substitutions may be effected by those skilled in the art without departure either in spirit or scope from this disclosure in its broader aspects and as set forth in the appended claims. For example, small electrical motors can be operatively connected to the set mechanism 14 and the reset mechanism 16 for operating the mechanisms upon the application of electricity. In addition, the housing 18 can be provided in a configuration other than a straight cylindrical tube, such as a tube having a non-circular cross section and/or a tube that is serpentine or otherwise not straight. Moreover, the reset passageway does not have to be formed as an integral part of the housing 18 and can, for example, comprise a separate conduit connected between the reset port and the outlet 22 of the housing 18. Accordingly, other embodiments are within the scope of the following claims. In addition, the safety valve disclosed herein, and all elements thereof, are contained within the scope of at least one of the following claims. No elements of the presently disclosed safety valve are meant to be disclaimed.

What is claimed is:

1. A valve assembly comprising:
   a housing extending between an inlet and an outlet;
   an excess flow shut-off mechanism contained within the housing, the excess flow shut-off mechanism is normally biased to an open position allowing fluid flow through the housing and is adapted to move to a closed position preventing fluid flow through the housing when upstream pressure between the inlet and the shut-off mechanism is greater by at least a predetermined amount than downstream pressure between the shut-off mechanism and the outlet, the excess flow shut-off mechanism including,
      a valve seat;
      a valve member movable between an open position allowing fluid flow through the housing and a closed position wherein the valve member contacts the valve seat and prevents fluid flow through the housing;
      a spring biasing the valve member to the open position, wherein the shut-off mechanism is positioned within the housing such that the valve member is move to the closed position against the biasing force of the spring when upstream pressure between the inlet of the housing and the shut-off mechanism is greater by at least a predetermined amount than downstream pressure between the shut-off mechanism and the outlet of the housing; and
   a set mechanism that, when actuated, reduces the downstream pressure between the shut-off mechanism and the outlet and allows the shut-off mechanism to be moved to the closed position.

2. The valve assembly of claim 1, wherein the set mechanism comprises:
   a set port located in a sidewall of the housing between the shut-off mechanism and the outlet;
   a plunger received in the set port and including a first end located out of the housing and a second end located within the housing;
   a button secured to the first end of the plunger;
   a seal secured to the second end of the plunger; and
   a spring biasing the plunger out of the housing so that the seal normally closes the set port, whereby pressing the plunger into the housing causes the seal to be moved away from the set port and the set port opened.

3. The valve assembly of claim 2, wherein the set mechanism further comprises a retainer secured to the second end of the plunger and the seal is located between the retainer and the set port of the housing.

4. The valve assembly of claim 1, wherein the valve member comprises a sleeve having a flow passage and the valve seat includes an insert for receipt in the flow passage as the valve member is moved to the closed position.

5. The valve assembly of claim 1, further comprising a reset mechanism that, when actuated, equalizes the upstream pressure and the downstream pressure.

6. The valve assembly of claim 5, wherein the reset mechanism comprises:
   a reset port located in a sidewall of the housing between the inlet and the shut-off mechanism;
   a reset plunger received in the reset port and including a first end located out of the housing and a second end located within the housing;
   a button secured to the first end of the reset plunger;
   a seal secured to the second end of the reset plunger;
   a reset passageway providing fluid connection between the reset port and the outlet of the housing; and
   a spring biasing the reset plunger out of the housing so that the seal normally closes the reset port and prevents fluid communication through the reset passageway, whereby pressing the plunger into the housing causes the seal to be moved away from the reset port so that fluid can bypass the shut-off mechanism through the reset passageway and equalize the upstream pressure and the downstream pressure.

7. The valve assembly of claim 6, wherein the reset mechanism further comprises an o-ring positioned between the reset plunger and the reset port to prevent fluid from exiting the housing through the reset port when the plunger is pressed into the housing.

8. A valve assembly comprising:
   a housing extending between an inlet and an outlet;
   an excess flow shut-off mechanism including,
      a valve seat;
      a valve member movable between an open position allowing fluid flow through the housing and a closed position wherein the valve member contacts the valve seat and prevents fluid flow through the housing; and a spring biasing the valve member to the open position, wherein the shut-off mechanism is positioned within the housing such that the valve member is moved to the closed position against the biasing force of the spring when upstream pressure between the inlet of the housing and the shut-off mechanism is greater by at least a predetermined amount than downstream pressure between the shut-off mechanism and the outlet of the housing;

a set mechanism that, when actuated, reduces the downstream pressure between the shut-off mechanism and the outlet; and a reset mechanism that, when actuated, equalizes the upstream pressure and the downstream pressure.

9. The valve assembly of claim 8, wherein the valve member comprises a sleeve having a flow passage and the valve seat includes an insert for receipt in the flow passage as the valve member is moved to the closed position.

10. The valve assembly of claim 8, wherein the spring comprises a compression spring biasing the valve member away from the valve seat.

11. The valve assembly of claim 8, wherein the shut-off mechanism includes a fastener limiting movement of the valve member away from the valve seat.

12. The valve assembly of claim 8, wherein the housing defines a primary flow passageway receiving the excess flow shut-off mechanism and a reset passageway extending parallel with the primary flow passageway and connecting the inlet with the outlet, and the reset mechanism is adapted to open the reset passageway upon actuation.

13. The valve assembly of claim 8, wherein the housing defines a set port located between the shut-off mechanism and the outlet, and the set mechanism is adapted to open the set port upon actuation.

14. A valve assembly comprising:
a housing extending between an inlet and an outlet, and defining a primary flow passageway connecting the inlet with the outlet and a reset passageway connecting the inlet with the outlet;
an excess flow shut-off mechanism contained within the primary flow passageway of the housing, wherein the excess flow shut-off mechanism is normally biased to an open position allowing fluid flow through the primary flow passageway and is adapted to move to a closed position preventing fluid flow through the primary flow passageway when upstream pressure between the inlet and the shut-off mechanism is greater by at least a predetermined amount than downstream pressure between the shut-off mechanism and the outlet;
a reset mechanism adapted to normally close the reset passageway and, upon actuation, open the reset passageway and equalize the upstream pressure and the downstream pressure; and
a set mechanism that, when actuated, causes the shut-off mechanism to be moved to the closed position.

15. The valve assembly of claim 14, wherein the reset mechanism comprises:
a reset port located in a sidewall of the housing between the inlet and the shut-off mechanism, wherein the reset passageway extends between the reset port and the outlet of the housing;
a reset plunger received in the reset port and including a first end located out of the housing and a second end located within the housing;
a button secured to the first end of the reset plunger;
a seal secured to the second end of the reset plunger; and
a spring biasing the reset plunger out of the housing so that the seal normally closes the reset port and prevents fluid communication through the reset passageway.

16. The valve assembly of claim 15, wherein the reset mechanism further comprises an o-ring positioned between the reset plunger and the reset port to prevent fluid from exiting the housing through the reset port when the plunger is pressed into the housing.

17. The valve assembly of claim 14, wherein the reset passageway extends parallel with the primary flow passageway.

18. The valve assembly of claim 14, wherein the set mechanism, when actuated, reduces the downstream pressure between the shut-off mechanism and the outlet.

* * * * *